United States Patent Office 3,225,001
Patented Dec. 21, 1965

3,225,001
COLOR-STABLE VINYL CHLORIDE POLYMERS
George J. Darsa, Bronx, N.Y., assignor to National Lead Company, New York, N.Y., a corporation of New Jersey
No Drawing. Filed Mar. 27, 1961, Ser. No. 98,301
8 Claims. (Cl. 260—45.75)

This invention relates to the stabilization of resinous compositions containing vinyl chloride polymers and copolymers. In particular this invention relates to an improved vinyl chloride resin composition stabilized as to the deleterious effects of heat and light.

The problem of stabilizing vinyl chloride resins at elevated temperatures is one of long duration. Primarily, most of the stabilizer research has been directed toward providing adequate stabilizing materials which will protect the plastic, both in the formation stages and finished compositions, against the deleterious effects of heat and light. Utilization of higher processing temperatures has required the art to develop new materials and means to inhibit or delay the discoloration and subsequent loss of properties of the vinyl chloride resins. Although slight discoloration on heating may not detract to any appreciable extent from the physical properties of the resin, the discoloration limits the usefulness in many applications. While many of the current stabilizers have effected substantial improvements in providing stabilized plastics, there is still much to be desired in the results obtained.

For many current applications of vinyl resins, the resin is compounded so as to produce a clear, transparent plastic product. In applications where clear vinyl plastics are used, the stabilizer, in addition to fulfilling its primary function, must be of such a nature that it does not impair the clarity of the finished product. Some of the best of the conventional heat-stabilizers are unacceptable for use in clear vinyl formulations because they impair clarity, leading to hazy or even opaque products.

It is therefore an object of this invention to provide a novel stabilizer for vinyl chloride polymer and copolymer resins. Another object is to provide an improved heat-stabilizer for vinyl chloride containing resins. Still another object is to provide a stabilizer as aforesaid, which is capable of use in clear vinyl plastic formulations and does not impair the clarity thereof. Other objects and advantages will become apparent from the following more complete description and claims.

Broadly, this invention contemplates an auxiliary stabilizer for vinyl chloride polymer and copolymer resins comprising a hindered bisphenol and a trivalent-organo-phosphorus compound, said hindered bisphenol corresponding to the formula:

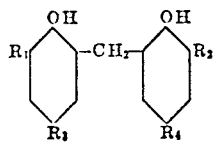

where $R_1$, $R_2$, $R_3$ and $R_4$ are alkyl groups having a maximum of 4 carbon atoms and said trivalent organo-phosphorus compound corresponds to one of the following formulae: $(RO)_3P$ and $(RO)_2PR'$, where R and R' are radicals selected from the group consisting of aliphatic hydrocarbon radicals containing from 1 to 18 carbon atoms and aryl radicals containing from 6 to 18 carbon atoms. This invention further contemplates an improved plastic composition comprising a vinyl chloride resin, and a stabilizer according to the present invention.

In a particularly desirable embodiment, this invention contemplates a combination of three stabilizing components, namely a multivalent metal salt primary stabilizer and an auxiliary stabilizer consisting of a hindered bisphenol and a trivalent organo-phosphorus compound.

The multivalent metal salt primary stabilizers are well known to the art. Typical of those stabilizers used in vinyl chloride resin compositions are the multivalent metal phenolates and multivalent metal carboxylates. The multivalent metals are selected from the group consisting of the alkaline earth metals, magnesium, cadmium, zinc, and aluminum. Examples of phenols that may be used in the form of metal phenolates we mention: methyl-, ethyl-, butyl-, amyl-, octyl-, nonyl-, dodecyl-, octadecyl-, and oleylphenol; dibutyl-, diamyl-, dinonyl- and didodecyl-phenol. The carboxylates may be aromatic or aliphatic. As examples of aromatic carboxylates we mention benzoate, p-tertiary butylbenzoate, benzoylbenzoate and as aliphatic carboxylates we may mention 2-ethylhexoate, caprate, laurate, stearate, oleate and ricinoleate. The multivalent metal salt stabilizers may be used singly or preferably in combination. Such combinations may include mixture of the salts of barium and cadmium, barium and zinc; calcium and zinc; etc.

The hindered bisphenols useful in this invention are those represented by the formula:

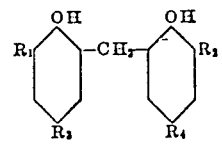

where $R_1$, $R_2$, $R_3$ and $R_4$ are alkyl groups, each group containing a maximum of 4 carbon atoms and where $R_1$ and $R_2$ are preferably tertiary alkyl groups and where all positions ortho and para to the hydroxyl groups have substituted hydrocarbon radicals. Examples are 2,2'-methylene bis-4-methyl-6-tertiary butylphenol, 2,2'-methylene bis-4-ethyl-6-tertiary butylphenol, 2,2'-methylene bis-4-tertiary butyl-6-methylphenol, and 2,2'-methylene bis-4,6-tertiary butyl phenol.

The trivalent organo-phosphorus compounds may be from the group consisting of phosphites and phosphonites represented by their respective formulae $(RO)_3P$ and $(RO)_2PR'$, where R and R' represent radicals selected from the group consisting of aliphatic hydrocarbon radicals containing from 1 to 18 carbon atoms and aryl radicals containing from 6 to 18 carbon atoms. Examples of such compounds are alkyl and aryl phosphites such as triphenyl-, tricresyl-, dioctyl phenyl-, and trioctyl- phosphite and dinonylphenyl- and dioctyl benzenephosphonites.

The manipulative procedure is the same in all cases, whether the contemplated material is a phosphite or a phosphonite.

The color-preservative auxiliary stabilizer consisting of a hindered bisphenol and a trivalent organo-phosphorus compound, as described above, may be combined in a single package along with the multivalent-metal salt primary stabilizer or may be contained in a separate package. In addition, the hindered bisphenol and trivalent phosphorus compound may be added individually to the vinyl composition. We have found that all methods of introducing our auxiliary stabilizer into vinyl chloride resins yield excellent results.

Methods for the preparation of the hindered bisphenol and trivalent organo-phosphorus compounds are well known to the art and constitute no part of the present invention. A wide range in the proportion of multivalent metal salt primary stabilizer to auxiliary stabilizer is effective, and the desired proportions may be left to the discretion of the compounder. We have attained good results by incorporating from about 0.05 to about 10.0 parts of an auxiliary stabilizer and particularly good results from about 0.1 to about 5.0 parts of an auxiliary stabilizer consisting of a hindered bisphenol and a trivalent organo-phosphorus compound, per 1 part of multivalent metal salt primary stabilizer. In general, for 100 parts of a vinyl chloride resin, from about 0.6 to about 10.0 parts of a primary plus auxiliary stabilizer is employed.

The auxiliary stabilizer composition also may vary over a wide range, but in general for good results the hindered bisphenol should be present from about 0.005 to about 10 parts per 1 part of trivalent organo-phosphorus compound. For 100 parts of a vinyl chloride polymer or copolymer resin, we have attained good results by incorporating from about 0.001 to about 2.0 parts of hindered bisphenol and preferably from about 0.005 to 1.0 part; and from about 0.01 to about 10.0 parts of trivalent organo-phosphorus compound and preferably from about 0.1 to about 1.0 part as the auxiliary stabilizer.

While hindered bisphenols (Myers et al., U.S. Patent No. 2,820,744) and organic phosphites (Leistner et al., U.S. Patent 2,564,646) have been proposed separately as stabilizers, we have found that their combination, along with a metal salt stabilizer, has given an unexpected and synergistic effect in color stabilization. To be useful, the hindered bisphenols and trivalent organo-phosphorus compounds must be used with a primary stabilizer, where they exert a synergistic effect and increase the overall effectiveness of the combination. This overall increase in effectiveness can, in many cases, reduce the amount of primary stabilizer heretofore necessary for maximum stabilization, thereby reducing some of the inherent problems found with primary stabilizers, among which we may mention clarity and plating.

The following examples, given by way of illustration, embody a specific resin, one primary plasticizer, one secondary plasticizer, two primary stabilizer systems and one lubricant for purposes of uniformity and comparability. Other homopolymers, copolymers, plasticizers, stabilizers and lubricants may be substituted in specific examples yielding approximately the same results.

EXAMPLE I

The following compositions were weighed, mixed, heated on a two-roll mill at a temperature of 315° F. and milled for three minutes until substantially uniform. The compositions were then sheeted into 40-mil sheets. The data set forth in Table I demonstrates the combined effect of a trivalent organo-phosphorus compound and a hindered bisphenol.

*Table I*

| Component | Composition 1, parts by weight | Composition 2, parts by weight | Composition 3, parts by weight | Composition 4, parts by weight |
|---|---|---|---|---|
| Polyvinylchloride resin | 100 | 100 | 100 | 100 |
| Dioctylphthalate | 40 | 40 | 40 | 40 |
| Epoxidized soybean oil | 3 | 3 | 3 | 3 |
| Stearic acid | 0.5 | 0.5 | 0.5 | 0.5 |
| Barium nonylphenolate | 0.5 | 0.5 | 0.5 | 0.5 |
| Cadmium p-t-butylbenzoate | 0.25 | 0.25 | 0.25 | 0.25 |
| 2,2'-methylene bis-4-ethyl-6-tertiary butylphenol | 0.0 | 0.0 | 0.7 | 0.3 |
| Triphenyl phosphite | 0.0 | 0.7 | 0.0 | 0.4 |

The plastic compositions were exposed to a temperature of 400° F. with periodic sampling to determine heat stability. Composition 1, after 5 minutes exposure, showed a light tan discoloration and after 15 minutes had a pronounced yellow discoloration. Composition 2 after a 15 minute exposure had a yellow discoloration and after 25 minutes had a deep yellow discoloration. Composition 3 after 5 minutes exposure had a tan discoloration and after 15 minutes had a deep tan-yellow discoloration. Composition 4, after 15 minutes had a slight off white discoloration and after 25 minutes had only a light yellow discoloration, in addition to exceptional clarity. The above examples and particularly composition 4 shows the combination effect of a trivalent organo-phosphorus compound and a hindered bisphenol as compared to compositions containing each separately at approximately double the concentration.

EXAMPLE II

The following compositions were prepared and tested in the same manner as in Example I. This example demonstrates the effectiveness of the claimed auxiliary stabilizer of this invention when used in conjunction with a primary stabilizer. Table II denotes the compositions.

*Table II*

| Component | Composition 5, parts by weight | Composition 6, parts by weight | Composition 7, parts by weight | Composition 8, parts by weight | Composition 9, parts by weight |
|---|---|---|---|---|---|
| PVC resin | 100 | 100 | 100 | 100 | 100 |
| DOP | 40 | 40 | 40 | 40 | 40 |
| Epoxy plasticizer | 3 | 3 | 3 | 3 | 3 |
| Stearic acid | 0.5 | 0.5 | 0.5 | 0.5 | 0.5 |
| Barium nonylphenolate | 1.0 | 2.0 | 0.0 | 0.0 | 1.0 |
| Cadmium p-t-butyl benzoate | 0.5 | 1.0 | 0.0 | 0.0 | 0.5 |
| 2,2'-methylene bis-4-ethyl-6-tertiary butylphenol | 0.0 | 0.0 | 0.3 | 0.6 | 0.3 |
| Triphenyl phosphite | 0.0 | 0.0 | 0.4 | 0.8 | 0.4 |
| Degree of discoloration | | | | | |
| Heat stability 400° F.: After 10 min. exposure | lt. yellow | yellow | deep red | deep red | almost colorless. |
| After 25 min. exposure | yellow | dp. yellow | v. dp. red | v. dp. red | v. lt. yellow. |

The above tabulated results show that composition 9, namely the instant invention, is more effective than composition 6 which contains twice the amount of primary stabilizer without any auxiliary stabilizer. It further shows that the total amount of stabilizer may be reduced in the plastic composition and yield better heat stability results. Compositions 7 and 8 demonstrate that the auxiliary stabilizer when used alone has almost no stabilizing effect and must be used in conjunction with a primary stabilizer to be effective.

EXAMPLE III

Compositions containing 100 parts of a polyvinylchloride resin, 40 parts of DOP, 3 parts of epoxy plasticizer, 0.5 part of stearic acid, 1.0 part of barium nonylphenolate, 0.5 part of cadmium p-tertiary butylbenzoate, 0.1 part of 2,2'-methylene bis-4-ethyl-6-tertiary butylphenol and 0.4 part of a trivalent organo-phosphorus compound were tested for heat stability and clarity. The trivalent organo-phosphorus compounds evaluated were octyl diphenyl phosphonite, nonyl diphenyl phosphonite, phenyl diphenyl phosphonite, triphenyl phosphite and triisooctyl phosphite. The composition containing the different phosphorus compounds all showed a good degree of heat stability and clarity.

EXAMPLE IV

Compositions containing 100 parts of a polyvinyl chloride resin, 40 parts of DOP, 3 parts of epoxy plasticizer, 0.5 part of stearic acid, 1.0 part of barium nonylphenolate, 0.5 part of cadmium p-tertiary butylbenzoate, 0.4 part of triphenyl phosphite and 0.1 part of any one of the hindered misphenols mentioned above give good heat stability results.

EXAMPLE V

A composition containing 100 parts of a polyvinylchloride resin, 40 parts of DOP, 3 parts of epoxy plasticizer, 0.5 part of stearic acid, 1.0 part of barium octoate, 0.45 part of cadmium octoate, 0.05 part of zinc octoate, 0.1 part of 2,2'-methylene bis-4-ethyl-6-tertiary butylphenol and 0.4 part of triphenyl phosphite was tested following the procedure of Example I and the results showed good heat stability.

EXAMPLE VI

Compositions similar to composition 4 of Example I were prepared except that the concentration of the hindered bisphenol was varied from 0.0 to 2.50 parts. The results showed good heat stability resulted when the hindered bisphenol was present from about 0.001 to about 2.0 parts and exceptional stability when the amount of bisphenol was from about 0.005 to about 1.0 part.

EXAMPLE VII

Compositions containing 100 parts of a polyvinylchloride resin, 40 parts of DOP, 3 parts of epoxy plasticizer, 0.5 part stearic acid, 1.0 part barium nonylphenolate, 0.5 part cadmium p-t-butylbenzoate, and 0.3 part of 2,2'-methylene bis-4-ethyl-6-tertiary butylphenol were prepared. The trivalent organo-phosphorus compound, triphenyl phosphite, was varied from 0.0 to 10.0 parts. The results showed a useful degree of stabilization when the phosphorus compound was present from about 0.01 part to about 10 parts; good stabilization when the phosphorus compound was present from about 0.1 to about 1.0 part; and partitcularly good stabilization from about 0.4 part to about 0.6 part.

As demonstrated by the examples, the objects of this invention have been achieved, the method being fully disclosed can readily be carried out by persons without special skill and requires a minimum of equipment. Particular features of the vinyl chloride resin composition are (1) its exceptional degree of color stabilization at elevated temperatures, (2) its high degree of stabilization against the deleterious effects of heat and (3) its exceptional clarity.

By the term "vinyl chloride resin" we mean to include the various vinyl resins compounds and combinations known to the art, including polyvinyl chloride; vinyl resins produced by copolymerizing vinyl chloride with vinyl acetate or other vinyl esters; vinyl resins produced by copolymerization with an acrylic compound such as ethyl and methyl methacrylate; vinylidene chloride, and vinyl-vinylidene chloride copolymers.

The stabilizers of this invention can be incorporated in chlorine containing vinyl resins alone or in conjunction with plasticizers, pigments, dyes, fillers, etc. The effectiveness of this invention is independent of the method or process employed in producing objects or items, these operations including milling, calendering, molding, extrusion, etc.

While this invention has been described in terms of certain preferred embodiments and illustrated by means of specific examples, these are illustrative only, and the invention is not to be construed as limited except as set forth in the following claims.

I claim:
1. A plastic composition stable at temperatures above 375° F. comprising a polyvinyl chloride homopolymer resin and a stabilizer present in an amount from about 0.6 to about 10 parts of resin, said stabilizer consisting essentially of (1) a primary stabilizer comprising a combination of at least one member selected from the group consisting of barium phenolates and barium monocarboxylates and at least one member selected from the group consisting of cadmium monocarboxylates and zinc monocarboxylates, and (2) an auxiliary stabilizer comprising a combination of a hindered bisphenol corresponding to the formula

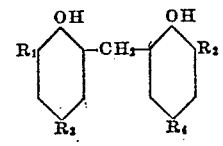

where $R_1$, $R_2$, $R_3$, and $R_4$ are alkyl groups having a maximum of 4 carbon atoms and a trivalent organo-phosphorus compound corresponding to one of the following formula, $(RO)_3P$ and $(RO)_2PR'$, where R and R' are radicals selected from the group consisting of alkyl and aryl radicals containing from 6 to 15 carbon atoms, said hindered bisphenol being present from about 0.005 to about 10 parts per 1 part of said trivalent organo-phosphorus compound, and where said auxiliary stabilizer is present from about 0.05 to about 10 parts per 1 part of said primary stabilizer.

2. A plastic composition according to claim 1, wherein said hindered bisphenol is 2,2'-methylene bis-4-methyl-6-tertiary butylphenol.

3. A plastic composition according to claim 1, wherein said hindered bisphenol is 2,2'-methylene bis-4-ethyl-6-tertiary butylphenol.

4. A plastic composition according to claim 1,, wherein said trivalent organo-phosphorus compound is triphenyl phosphite.

5. A plastic composition according to claim 1, wherein said trivalent organo-phosphorus compound is triisooctyl phosphite.

6. A plastic composition according to claim 1, wherein said trivalent organo-phosphorus compound is octyl diphenyl phosphonite.

7. A plastic composition according to claim 1, wherein said trivalent organo-phosphorus compound is nonyl diphenyl phosphonite.

8. A plastic composition according to claim 1, wherein said trivalent organo-phosphorus compound is phenyl diphenyl phosphite.

References Cited by the Examiner

UNITED STATES PATENTS

| | | | |
|---|---|---|---|
| 2,716,092 | 8/1955 | Leistner et al. | 260—45.95 |
| 2,820,774 | 1/1958 | Myers et al. | 260—45.95 |
| 2,935,491 | 5/1960 | Mack | 260—45.95 |
| 2,985,617 | 5/1961 | Salyer et al. | 260—45.9 |

OTHER REFERENCES

Smith: British Plastics, vol. 25.

LEON J. BERCOVITZ, *Primary Examiner.*

M. STERMAN, *Examiner.*